March 29, 1966   R. M. BUCHWALD   3,242,763
VEHICLE CONTROL PEDALS
Filed July 24, 1963   2 Sheets-Sheet 1

INVENTOR.
Robert M. Buchwald
BY
W. S. Pettigrew
ATTORNEY

March 29, 1966  R. M. BUCHWALD  3,242,763
VEHICLE CONTROL PEDALS
Filed July 24, 1963  2 Sheets-Sheet 2
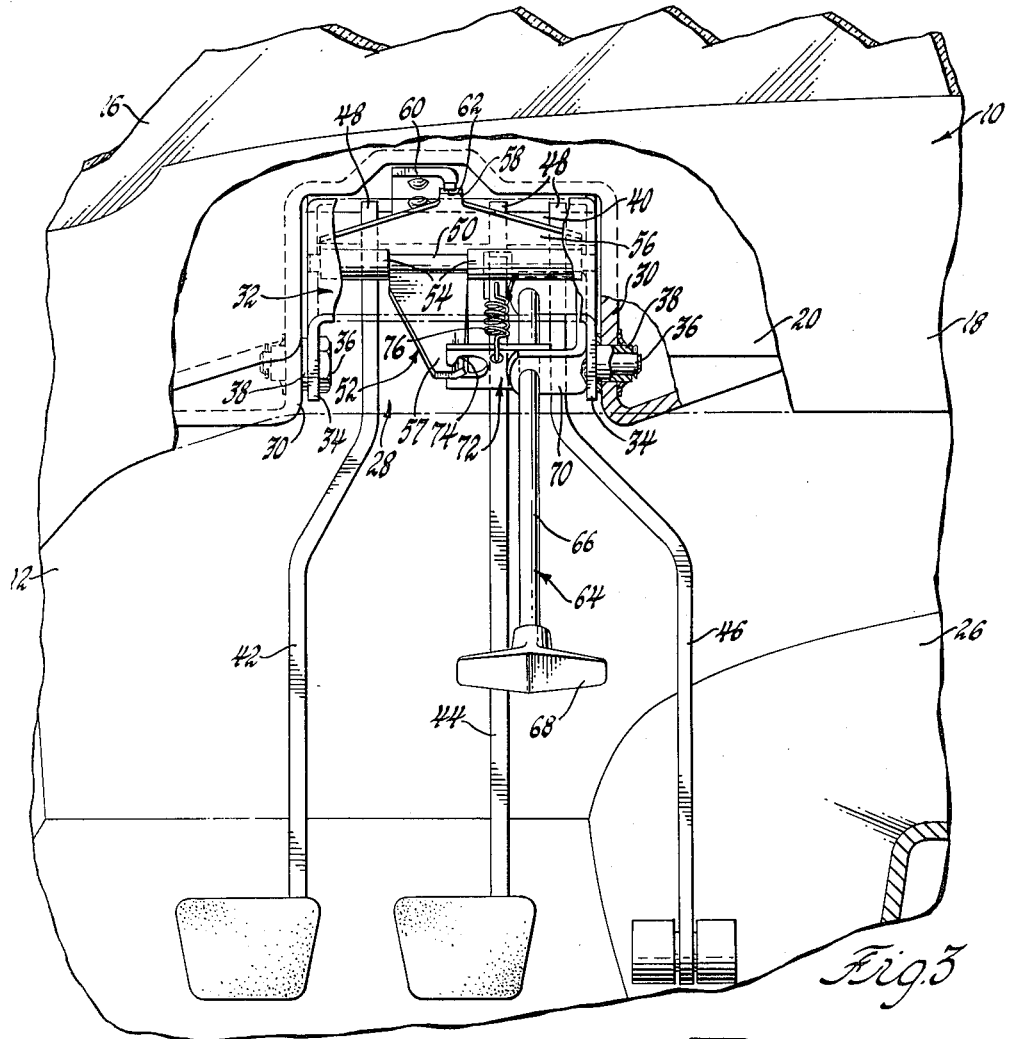
Fig. 3
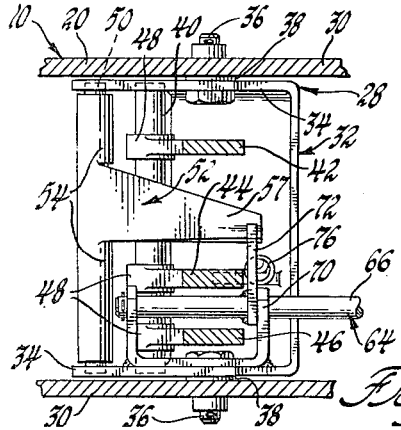
Fig. 4
Fig. 5
INVENTOR.
Robert M. Buchwald
BY
W. S. Pettigrew
ATTORNEY : 3,242,763
VEHICLE CONTROL PEDALS
Robert M. Buchwald, Berkley, Mich., assignor to General Motors Corporation, Detroit, Mich., a corporation of Delaware
Filed July 24, 1963, Ser. No. 297,297
5 Claims. (Cl. 74—560)

This invention relates to vehicle control pedals and more particularly to adjustable vehicle control pedals.

One feature of this invention is that it provides new and improved vehicle control pedals. Another feature of this invention is that it provides vehicle control pedals which may be adjusted with respect to the operator. A further feature of this invention is that the control pedals are swingably mounted on a support means for movement relative thereto to control the vehicle and that the support means are swingably mounted on the vehicle body for movement with the foot pedals as a unit about a transverse axis intermediate the ends of the control pedals to a plurality of adjusted positions relative to the operator. Yet another feature of this invention is that the support means includes a mounting bracket having detent means movable with the mounting bracket to a plurality of adjusted positions of the control pedals and cooperable with striker means on the vehicle body to locate the control pedals in any selected one of the plurality of positions thereof relative to the passenger seat, with manually operable means being provided to selectively release the detent means from the striker means and allow movement of the mounting bracket and control pedals relative to the vehicle body to any other selected position of the control pedals.

These and other features and advantages of the invention will be readily apparent from the following specification and drawings wherein:

FIGURE 3 is a partially broken away elevational view;

FIGURE 4 is a view taken generally along the plane indicated by line 4—4 of FIGURE 1; and FIGURE 5 is a view taken generally along the plane indicated by line 5—5 of FIGURE 1.

Figures 1, 2:
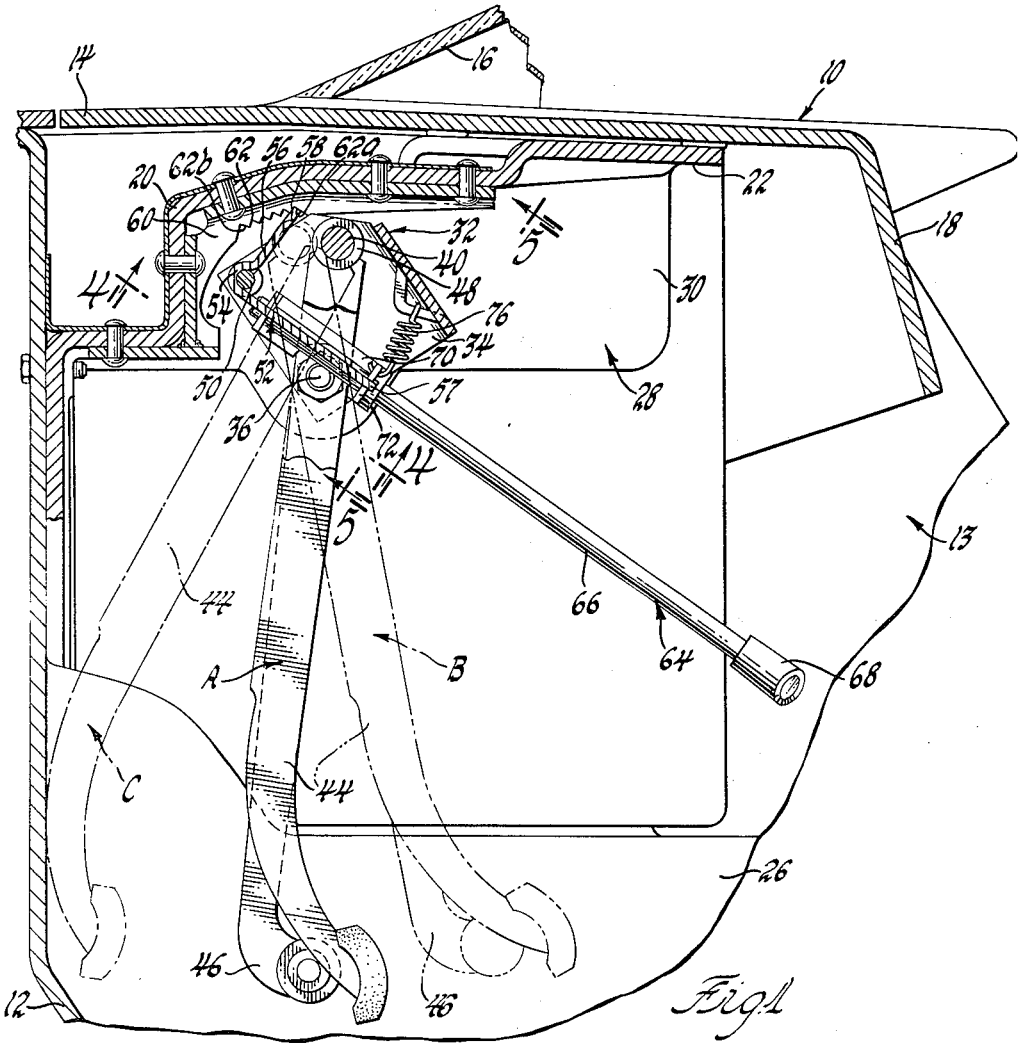
FIGURE 1 is a fragmentary sectional view of a vehicle body embodying control pedals according to this invention and showing the detent means in holding position.
FIGURE 2 is a view of a portion of FIGURE 1 showing the detent means in a released position.

Referring now particularly to FIGURES 1 and 3 of the drawings, a vehicle body designated generally as 10 includes a toe pan or dash panel 12 separating the forward engine compartment from the passenger compartment 13, an upper plenum panel 14 mounting the lower edge of the vehicle windshield 16 and terminating in an instrument panel 18, and a lower plenum panel 20 secured at a lower vertical flange thereof to panel 12 and secured at a rearward horizontal flange 22 thereof to panel 14. Panel 12 merges with the transmission tunnel 26. A seat, not shown, is located in the passenger compartment a sufficient distance from the toe pan to provide adequate leg-room for the driver or operator.

As shown in FIGURE 3, a control pedal well 28 is formed in panel 20, and a generally U-shaped foot pedal mounting bracket 32 is received within the well, with each leg 34 thereof located adjacent a respective vertical wall 30 of the well. A pair of studs 36 welded to legs 34 of the bracket are received within flanged bushings 38 mounted in walls 30 to rotatably mount bracket 32 in well 28 for swinging movement about the axis of the studs.

A control pedal shaft 40 is fixed at each end thereof to a leg 34 of the bracket. A set of control pedals includes a clutch pedal 42, a brake pedal 44, and an accelerator pedal 46. A bushing 48 on the upper end of each of the pedals is journaled on shaft 40 to pivotally mount each pedal on the shaft. Each control pedal is adapted to be connected to the appropriate control mechanism associated therewith.

A shaft 50 is fixed to the legs 34 of the bracket and rotatably mounts a generally L-shaped detent or detent member 52 having an upper leg 56 and a lower leg 57. As shown best in FIGURE 3, a pair of cylindrical portions 54 of the detent on either side of leg 57 encircle shaft 50 to journal the detent on the shaft. Leg 56 is provided with a detent projection 58 engageable with any one of a number of striker teeth 62 of a generally L-shaped striker plate 60 secured to panel 20 as shown in FIGURE 1. Teeth 62 are formed over an arc having its center at the axis of studs 36.

Leg 57 of detent 52 extends generally forwardly of shaft 50 and is connected to manual operating means 64. Operating means 64 generally includes an operating shaft 66 provided with an operating handle 68 at one end thereof and rotatably mounted within a generally U-shaped bracket 70 secured to a leg 34 of bracket 32. A detent releasing member 72 is secured to shaft 66 adjacent the rearward leg of bracket 70 and includes a forked end 74 embracing leg 57 of detent 52.

A tension spring 76 is hooked at one end thereof over a lanced-out portion of bracket 34 and hooked at the other end thereof within an aperture in member 72 to bias member 72 and shaft 66 clockwise as viewed in FIGURE 3, and in turn bias detent 52 about shaft 50 in a direction biasing projection 58 into engagement with any one of the striker teeth 62.

As shown in FIGURE 1, the foot pedals are adjusted to their forward terminal position indicated as "A" in solid lines, by positioning bracket 32 about studs 36 such that projection 58 engages within the most rearward tooth 62a of the striker teeth 62. Bracket 32 is thus held against clockwise rotation as the pedals are depressed toward the toe pan to control the vehicle. If it is desired that the foot pedals be adjusted rearwardly or closer to the operator, handle 68 is turned to rotate shaft 66 counterclockwise as viewed in FIGURE 3 and in turn rotate detent 52 clockwise as viewed in FIGURE 1 against the action of spring 76 to move projection 58 out of engagement with tooth 62a and allow counterclockwise rotation of bracket 32 to any desired position. The range of adjustment as defined by the striker teeth is between forward terminal position "A" and a rearward terminal position "B" wherein projection 58 engages the most forward tooth 62b of the striker teeth.

The foot pedals may also be adjusted rearwardly from position "A" by exerting upward pressure on handle 68 to rotate bracket 34 counterclockwise as detent projection 58 rides successively over striker teeth 62 to any desired position of the foot pedals. If the operator wishes, he may release detent 52 from striker 60 and push downwardly and forwardly on handle 68 to rotate bracket 32 clockwise from the position "A," FIGURE 1, to a stowed position "C" wherein the foot pedals are moved to the toe pan to permit relaxation of the legs of the operator when the vehicle is not in motion, or to permit easier access or egress to and from the passenger compartment.

It is to be noted that with the connection between the control pedals and the various control linkages located adjacent the axis of studs 36, very little or no accommodation will have to be provided in the linkages for movement of the foot pedals to the various adjusted positions thereof relative to the operator.

It is apparent that the vehicle control pedal arrangement of this invention is highly advantageous in that simple and economical means are provided for adjusting the position of the control pedals with respect to the operator.

Thus new and improved vehicle control pedals are provided.

I claim:

1. In combination with a vehicle body, a control pedal, support means, means swingably mounting said control pedal on said support means for control movement relative thereto, second means swingably mounting said support means on said body for movement of said support means and said control pedal in unison between a plurality of positions relative to said body, striker means on said body, detent means mounted on said support means and engageable with said striker means to hold said support means in any selected position thereof, and means for selectively releasing said detent means from said striker means for movement of said support means and said control pedal relative to said body.

2. In combination with a vehicle body, a control pedal, support means, first means swingably mounting said control pedal on said support means for control movement relative thereto, second means swingably mounting said support means on said body for movement of said support means and said control pedal relative thereto, cooperating means on said support means and said body arranged to normally releasably hold said support means against movement in one direction about said second means and normally permit movement of said support means and said pedal in the other direction about said second means, and means for selectively releasing said cooperating means to permit movement of said support means in said one direction.

3. In combination with a vehicle body, a control pedal, a mounting bracket, means mounting said control pedal on said mounting bracket for control movement relative thereto, means mounting said mounting bracket on said body for swinging movement of said mounting bracket and said control pedal in unison between a plurality of positions relative to said body, striker means on said body, a detent lever, means movably mounting said detent lever on said mounting bracket for movement relative thereto and movement therewith relative to said body, one leg of said detent lever being engageable with said striker means to hold said mounting bracket and said control pedal in any selected position thereof, and means engageable with the other leg of said detent lever to move said one leg of said detent lever out of engagement with said striker means to permit movement of said mounting bracket and said control pedal relative to said body.

4. In combination with a vehicle body, a control pedal, a mounting bracket having a pivot shaft, means journaling said control pedal adjacent one end thereof on said pivot shaft for swinging control movement relative to said mounting bracket, means spaced from said pivot shaft for pivotally mounting said mounting bracket on said body for movement of said mounting bracket and said control pedal in unison relative to said body about an axis intermediate the ends of said control pedal, striker means on said body, a detent member pivotally mounted on said mounting bracket for movement relative thereto and movement therewith relative to said body, said detent member being engageable with said striker means to releasably hold said mounting bracket and said control pedal in any selected position thereof, resilient means urging said detent member into engagement with said striker means, and manually operable means for moving said detent member out of engagement with said striker means against the action of said resilient means to permit movement of said mounting bracket and said control pedal relative to said body.

5. In combination with a vehicle body, a control pedal adapted to have a mechanism to be controlled connected thereto at a point thereon intermediate its ends, support means, means swingably mounting one end of said control pedal on said support means for control movement relative thereto, second swingable mounting means on said body formed along an axis, said second means mounting said support means for swinging movement thereof about said axis between a plurality of positions relative to said body, said axis intersecting said control pedal generally at said point of connection at all positions of said support means, and means for releasably holding said support means in a selected position thereof.

References Cited by the Examiner

UNITED STATES PATENTS 2,478,546   8/1949   Pickens et al. _____ 74—561 X
3,151,499   10/1964   Roe _____ 74—560

MILTON KAUFMAN, *Primary Examiner.*